(12) United States Patent
Cooper et al.

(10) Patent No.: US 10,997,141 B2
(45) Date of Patent: *May 4, 2021

(54) ANONYMOUS DEVICE OPERATION (71) Applicant: McAfee, LLC, Santa Clara, CA (US)

(72) Inventors: Geoffrey H. Cooper, Palo Alto, CA (US); Guy L. AlLee, Jr., Portland, OR (US)

(73) Assignee: McAfee LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,507

(22) Filed: Mar. 29, 2019

(65) Prior Publication Data

US 2019/0228001 A1 Jul. 25, 2019

Related U.S. Application Data (63) Continuation of application No. 14/757,399, filed on Dec. 23, 2015, now Pat. No. 10,289,610.

(Continued)

(51) Int. Cl.
*G06F 21/62* (2013.01)
*H04L 9/32* (2006.01)
(Continued)

(52) U.S. Cl.
CPC ...... *G06F 16/2255* (2019.01); *G06F 21/6254* (2013.01); *H04L 9/32* (2013.01);
(Continued)

(58) Field of Classification Search
CPC .............................. G06F 16/2255; H04L 9/32
See application file for complete search history.

(56) References Cited

U.S. PATENT DOCUMENTS 8,595,505 B2  11/2013  Brickell et al.
9,635,021 B2 *  4/2017  Smith ............... H04L 63/0823
(Continued)

OTHER PUBLICATIONS

International Search Report and Written Opinion dated Sep. 12, 2016 in International Patent Application No. PCT/US2016/042552, pp. 1-9.

(Continued)

*Primary Examiner* — Kevin Bechtel
*Assistant Examiner* — Suman Debnath
(74) *Attorney, Agent, or Firm* — Byrne Poh LLP (57) ABSTRACT

An appliance includes a processor, a medium, a registration application, and a monitoring application. The registration application includes instructions in the medium that, when read and executed by the processor, configure the registration application to write a transaction identifier to a start message, the transaction identifier identifying the appliance, write a dataset of interest identifier to the start message, and send the start message to a database. The dataset of interest identifies a group of appliances including the appliance. The monitoring application includes instructions in the medium that, when read and executed by the processor, configure the monitoring application to monitor operations executed on the appliance, write data resulting from the operations to a data message, and send the data message anonymously to the database. The data message is signed with a member key associated with the group of appliances.

18 Claims, 7 Drawing Sheets

Related U.S. Application Data (60) Provisional application No. 62/205,989, filed on Aug. 17, 2015.

(51) Int. Cl.
  *G06F 16/22* (2019.01)
  *H04L 29/06* (2006.01)

(52) U.S. Cl.
  CPC ........ *H04L 9/3255* (2013.01); *H04L 63/0421* (2013.01); *H04L 63/062* (2013.01); *H04L 63/065* (2013.01); *H04L 63/08* (2013.01); *H04L 2209/42* (2013.01); *H04L 2209/56* (2013.01)

(56) References Cited

U.S. PATENT DOCUMENTS

| | | | |
|---|---|---|---|
| 2005/0172137 A1* | 8/2005 | Hopkins | ............... G07F 7/1008 713/185 |
| 2008/0270790 A1 | 10/2008 | Brickell et al. | |
| 2010/0275015 A1 | 10/2010 | Zhang et al. | |
| 2012/0023334 A1 | 1/2012 | Brickell et al. | |
| 2014/0059694 A1 | 2/2014 | Lortz et al. | |
| 2014/0181995 A1* | 6/2014 | Smith | ................. G06F 21/6254 726/28 |
| 2015/0095104 A1 | 4/2015 | Goldberg | |
| 2016/0337329 A1 | 11/2016 | Sood et al. | |

OTHER PUBLICATIONS

Notice of Allowance dated Feb. 13, 2019 in U.S. Appl. No. 14/757,399, pp. 2-4.
Office Action dated May 18, 2018 in U.S. Appl. No. 14/757,399, pp. 2-13.
Office Action dated Oct. 5, 2017 in U.S. Appl. No. 14/757,399, pp. 2-11.
Supplementary European Search Reported dated Jan. 23, 2019 in EP Patent Application No. 16837454.4, pp. 1-7.

* cited by examiner

ANONYMOUS DEVICE OPERATION

CROSS-REFERENCE TO RELATED APPLICATIONS

This application is a continuation of U.S. patent application Ser. No. 14/757,399, filed Dec. 23, 2015, which claims the benefit of U.S. Provisional Patent Application No. 62/205,989, filed Aug. 17, 2015, each of which is hereby incorporated by reference herein in its entirety.

TECHNICAL FIELD OF THE INVENTION

Embodimets of the present invention relate generally to computer processing and, more particularly, to anonymous device operation.

BACKGROUND

Enhanced Privacy Identification (EPID) is a digital signature scheme. A group public key in EPID corresponds to multiple private keys. A private key can be used to generate a signature. The signature can be verified using the group public key.

EPID is an extension of Direct Anonymous Attestation (DAA). DAA is a cryptographic scheme for providing anonymous signatures. DAA is used for the Trusted Platform Module created by the Trusted Computing Group.

A feature of EPID is that keys issued can be blind. The issuer need not know a member's private key. The EPID signatures are anonymous. The EPID signature cannot be opened to identify the member. The linkability of an EPID signature and members of a group depend upon the base values that are chosen and revealed during the signature. Signatures using a common name verifier can be linked. A signature using a random signature cannot be linked. Signatures using different name verifies cannot be linked. EPID signatures or keys can be revoked.

DETAILED DESCRIPTION

Figure 1:
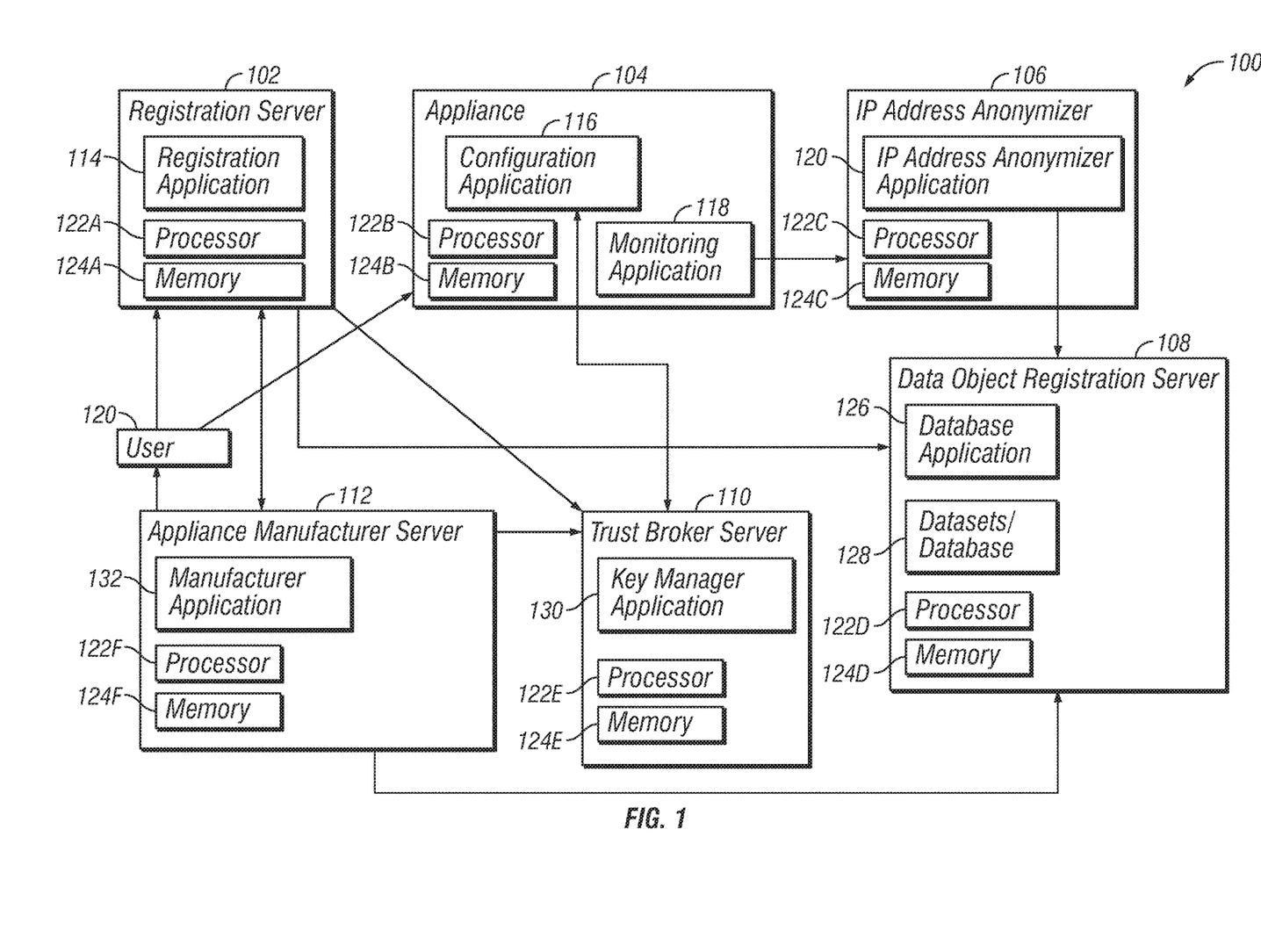
FIG. 1 is an illustration of an example embodiment of a system for anonymous device operation, in accordance with embodiments of the present disclosure.

FIG. 1 is an illustration of an example embodiment of a system 100 for anonymous device operation, in accordance with embodiments of the present disclosure. Data from devices in system 100 may be anonymously logged. In one embodiment, the identity of the specific devices in system 100 for which data is logged might not be determinable. In another embodiment, system 100 may verify that a given device in system 100 has logged data, even though the logged data cannot be traced from the data back to its original source, as devices in system 100 are anonymous.

The anonymous-yet-logged operation may be of, for example, an appliance 104. Appliance 104 may implement any suitable kind of electronic device for which anonymous operation will be performed. For example and without limitation, appliance 104 may include a computer, mobile device performing an application, a refrigerator, a home automation system, a sprinkler system, an oven, a washer, a dryer, an automobile, a consumer electronics device, a vending machine, a gaming machine, office equipment, or manufacturing equipment. Appliance 104 may perform various operations according to its design and configuration.

In one embodiment, the operation of appliance 104 may be monitored anonymously. The operation of appliance 104 may generate data that may be gathered, aggregated, and analyzed. The data resulting from the operation of appliance 104 might not be traceable back to the unique appliance that generated some or all of the data. Operational data may be anonymous so as to protect the identity or privacy of users or owners of appliance 104. The operational data might otherwise allow inference or data mining of private information about user 120, even if specific user information was not explicitly made. For example, if operation of a house's washer was initiated at a given time, and the fact of the operation identifying the washer was logged, one would be able infer that someone was at home at the location where the washer located at the time when the washer started working. Thus, in order to preserve anonymity, information directly or indirectly identifying the particular washer might need to be discarded, not reported, or otherwise eliminated when gathering data about the washer's operation.

However, verification of logging of information from appliance 104 may be desirable or necessary. The verification may promote participation in, for example, gathering of data for the public good to reach community goals, data logging by a manufacturer to spot defects or broad-based user tendencies, energy or resource conservation, or other statistical tendencies for verifying or predicting need of services or goods. A party performing such analysis may need assurances that a given appliance has provided data relating to its operation. The identification that the given appliance has provided such information, however, is not anonymous. Nevertheless, in the system of FIG. 1 the anonymous operation of appliance 104 may be linked with the non-anonymous verification of the submission of data, while preserving the anonymity of appliance 104.

Accordingly, the operation of appliance 104 may be monitored in relation to a non-anonymous operation, action, event, transaction, or other event. In various embodiments, the relationship between the anonymous and non-anonymous operations might not cause the anonymous operation to become non-anonymous.

In another example, anonymous device operation and profile data may be collected as part of an incentive program. User 120 of an appliance may receive an incentive in exchange for providing anonymous device operation and profile data. However, the incentive may include a transaction that is non-anonymous, such as the incentive itself or being able to prove that the information will be provided. In system 100, the proving of the provision of the information must not break the anonymity of the data that was itself provided. The non-anonymous operation may also include a purchase of appliance 104 or a registration of appliance 104.

In one embodiment, the data may be provided using an anonymous group attestation. For example, the data may be signed with a key that is not specific to a given appliance or signer. The key may be included an N:1 configuration, wherein many different private keys or instances of a key may sign or encrypt data, but a single key may be used to read or decrypt the data. The keys to sign encrypt the data may be the same for an entire type, model, or version of an appliance. Accordingly, aggregated data may be signed by the same key, and decryption of such data may yield the data results from many different sources; however, there might be no way to tell from which instance of an appliance an individual portion of the data was generated. The key that signed the data might be specific to the type, model, or version of appliance 104 but might not be specific to the instance of appliance 104. A given key may be provided to all instances of an appliance of a given type, model, or version of appliance 104. Moreover, a given key might be provided to all instances of an appliance within a given geographic region, or other demographic basis, to the extent that all data is to be so-grouped together.

In a further embodiment, the data may be signed with an Enhanced Privacy Identifier (EPID). The EPID may include a form of Direct Anonymous Attestation. In some cases, any suitable form of direct anonymous attestation mechanisms may be used. In another embodiment, the data generated may be anonymous from its creation, without use of a trusted third party to make the data anonymous. Other systems may utilize a trusted third party to completely anonymize data after it is generated. In contrast, the present system may be configured to create an anonymous data flow at the source, appliance 104. Furthermore, in other systems appliances, operations, and associated data might be completely anonymous or completely identified. In contrast, the present system may link an identified, non-anonymous information, data, or operation of appliance 104 with anonymous information, data, or operation of appliance 104 without allowing the identified, non-anonymous information, data, or operation to identify or otherwise corrupt the anonymous information, data, or operation. While an EPID is provided as an example key system, another suitable asymmetric key system, wherein each public key can have many different private keys, each such private key identical in its ability to sign data that is verified by the public key, may be used. Such a key system might make it impossible to track the different private keys—that is, it is impossible to tell which private key belonging to a given appliance created a given signature. In this way, the signed data from members of the group using the same key is anonymous within the group, but the resulting data can be attested to actually belong to the group.

In order to provide such links while still preserving anonymity, system 100 may include any suitable number and kind of elements. For example, system 100 may include a registration server 102. Registration server 102 may include a registration application 114. Registration application 114 may be configured for operation by instructions resident on a memory 124A for execution by a processor 122A. Registration application 114 may provide access by for user 120 to begin the process of setting up an appliance 104 for anonymous operation and logging.

Furthermore, system 100 may include an Internet Protocol (IP) address anonymizer 106 or envelope anonymizer. IP address anonymizer 106 may include an IP address anonymizer application 114. IP address anonymizer application 114 may be configured for operation by instructions resident on a memory 124C for execution by a processor 122C. IP address anonymizer application 114 may provide proxy services so that data reported from an appliance may be divorced from the server that receives such data, further improving anonymous operation.

System 100 may include a data object registration server 108. Data object registration server 108 may include a database application 126. Moreover, data object registration server 108 may include one or more datasets or databases 128. Datasets 128 may be implemented in any suitable data structure or type of database. Database application 126 may be configured for operation by instructions resident on a memory 124D for execution by a processor 122D. Database application 126 may provide data aggregation for data logged by appliance 104.

System 100 may include a trust broker server 110. Trust broker server 110 may include a key manager application 130. Key manager application 130 may be configured for operation by instructions resident on a memory 124E for execution by a processor 122E. Key manager application 130 may handle generation and assignment of keys for system 100.

System 100 may include an appliance manufacturer server 112. Appliance manufacturer server 112 may include a manufacturer application 132. Manufacturer application 118 may be configured for operation by instructions resident on a memory 124F for execution by a processor 122F. Manufacturer application 132 may establish parameters for logging operations by various appliances that are produced by the manufacturer.

Appliance 104 may include a configuration application 116 and a monitoring application 118. These applications may be configured for operation by instructions resident on a memory 124B for execution by a processor 122B. Configuration application 116 may be used to set up appliance 104 for anonymous data logging. Monitoring application 118 may log the operations and data of appliance 104.

The elements of system 100 may include more or less elements that these, or equivalent elements that may vary according to the specific type of operation or appliance. Furthermore, the operation and configuration of the elements of system 100 within this disclosure may be performed by suitable other elements of system 100. The various elements of system 100 may be communicatively coupled to each other as necessary to implement the functionality described herein. A user 120 may interact with various portions of system 100.

Various elements of system 100 may be implemented with one or more processors and memories communicatively coupled to one another. Each one of the elements of system 100 may include any suitable number and kind or more applications, scripts, application programming interfaces, software interfaces, executables, processes, programs, modules, or other components to carry out the functionality of the element. Each of the elements of system 100 may be implemented in any suitable manner, such as on a computer, server, mobile device, blade, cloud computing scheme, digital circuitry, analog circuitry, or any combination thereof. The applications and similar components illustrated in FIG. 1 are given for example purposes only, and more or fewer components may be used. Although described as applications, the elements of FIG. 1 can also be implemented as scripts, application programming interfaces, software interfaces, executables, processes, programs, modules, or other components.

The processors in system 100 may include, for example, a microprocessor, microcontroller, digital signal processor (DSP), application specific integrated circuit (ASIC), or any other digital or analog circuitry configured to interpret and/or execute program instructions and/or process data. In some embodiments, the processors may interpret and/or execute program instructions and/or process data stored in the memories. Memory may be configured in part or whole as application memory, system memory, or both. Memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100 and its components may reside in the memories for execution by the processors.

The processors may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. The processors may also include register renaming logic and scheduling logic, which generally allocate resources and queue the operation corresponding to the convert instruction for execution. After completion of execution of the operations specified by the code instructions, back end logic within the processors may retire the instruction. In one embodiment, the processors may allow out of order execution but requires in order retirement of instructions. Retirement logic within the processors may take a variety of forms as known to those of skill in the art (e.g., re-order buffers or the like). The processor cores are thus transformed during execution of the code, at least in terms of the output generated by the decoder, the hardware registers and tables utilized by the register renaming logic, and any registers modified by the execution logic User 120 may receive instructions from a vendor, manufacturer, municipality, or other entity to take action to provide anonymous operation data from her appliance. User 120 may receive instructions directly from a vendor, or may receive instructions embedded in appliance 104. For example, user 120 may receive instructions to register her appliance with a utility company for aggregate, anonymous data logging and analysis, or a rebate voucher from a manufacturer for aggregate, anonymous data logging and analysis. In such cases, the issuer of the instructions may need assurance that the anonymous data is being collected, but user 120 of appliance 104 may need assurance that the data remains anonymous.

User 120 may access a registration server 102 to register appliance 104 for reporting within system 100. User 120 may reference a code or other identifier of the request or requirement to register with the entity that wants the anonymous operational data. Registration server 102 may be powered by a registration application 114. Registration application 114 may generate a nonce. The nonce may include a random number that is only used once. The nonce may be configured to link the anonymous and non-anonymous aspects of the operation of appliance 104. The registration may include an identifier transaction, such that the user's information, appliance 104 model serial number, or other information is recorded. Registration application 114 may communicate this information to an entity that created the original request for the operational data, such as an appliance manufacturer server (AMS) 112. AMS 112 may include manufacturer application 132. In other situations, for example, a utility provider may have a server and application to perform equivalent functionality. Manufacturer application 132 may generate a transaction identifier to identify the user's commitment to send anonymous data.

Manufacturer application 132, possibly through registration server 102, may send this data to trust broker server 110. Trust broker server 110 may be configured to handle the key generation process. Trust broker server 110 may include key manager application 130 to perform such a process. Key manager application 130 may be configured to manage the use of EPID keys as well as a data object manager to store the resulting data. Key manager application 130 may be configured to register the transaction identifier with the correct EPID group key. Such a group key may be assigned to, for example, a make and model of an appliance. A data object manager may be resident upon a database application 126 on a data object registration server 108, or similar mechanism for maintaining a database. The data object manager may be configured to ensure that a database is available for the necessary EPID group. The database or portion of a database may be identified by a particular data object identifier, and the EPID group key is linked to this object identifier. The transaction identifier may be also linked to the object identifier for the next step in the algorithm. The registration web site returns the transaction identifier to user 120 or to appliance 104 as appropriate.

In one embodiment, user 120 may key the transaction identifier into appliance 104. Appliance 104 may have a hex or other suitable keypad, or may be addressable with a keyboard, screen, or other suitable input. In another embodiment, appliance 104 may receive the transaction identifier directly from, for example, registration application 114. In such an embodiment, a connection between registration server 102 and appliance 104 might be internally isolated in appliance 104 from the anonymous gathering of operational data. Since the transaction between appliance 104 and registration server 102 may be employed to perform privacy guarantees of data gathering, the portions of appliance 104 that perform this communication may be suitably isolated from the rest of the implementation of appliance 104. These might be isolated by, for example, using data abstraction, process separation, hypervisor isolation, separate hardware implementation, or other software or hardware isolation mechanisms.

Appliance 104 may utilize the transaction identifier to contact trust broker server 110 and data object manager. The transaction identifier may be used by key manager application 130 to provide appliance 104 with an EPID private key and a data object identifier. These might be used to sign and identify data so that the data may be appropriately routed to the correct database. Then, appliance 104 might start generating anonymous data.

In order to accomplish user verification, appliance 104 may be configured to inform the manufacturer that it includes EPID and Data Object Identifier credentials sufficient to report anonymous data. Appliance 104 may be able to add entries to database 128 properly. To show this, appliance 104 may be configured to initially send the transaction identifier as if it were a data item, signed with its EPID private key. Furthermore, the data item may be identified with the data object identifier. A type field can be used to distinguish this initial transmission from subsequent, actual anonymous data items. Manufacturer application 132 may be configured to periodically examine the database. When manufacturer application 132 finds a correctly signed transaction identifier, it may determine that user 120 or appliance is transmitting anonymous data. Thus, the manufacturer or entity requiring confirmation that appliance 104 is transmitting anonymous data may provide additional benefits for user 120 or appliance 104, or allow continued operation of appliance 104.

Subsequently, appliance 104 may be configured to regularly send anonymous data. Appliance 104 may conduct such operation with a monitoring application, while setup was performed with a configuration application. The anonymous data might not contain the transaction identifier, so these may be considered truly anonymous. In addition, packets from appliance 104 to database 128 might have their Internet Protocol (IP) addresses obscured by an IP address anonymizer application, included in the database server or by an IP address anonymizer. The IP addresses may be removed so as to avoid correlating user 120 or appliance 104 with the IP address of appliance 104. The IP address anonymizer may be implemented by, for example, a proxy service between appliance 104 and the database server or within the database server. Moreover, the IP address might be removed by use of IPv6 Privacy Extensions, Tor networking, dynamic host configuration protocol, or network address translation.

In another embodiment, appliance 104 may be configured to include a date in the signed message including the transaction identifier. Furthermore, appliance 104 may be configured to send the signed transaction identifier once per designated time period, such as each day or each month in which it is continuing to send anonymized data. By including a code, appliance 104 may be configured to indicate if user 120 has decided to continue or stop sending anonymized data.

Figure 2:
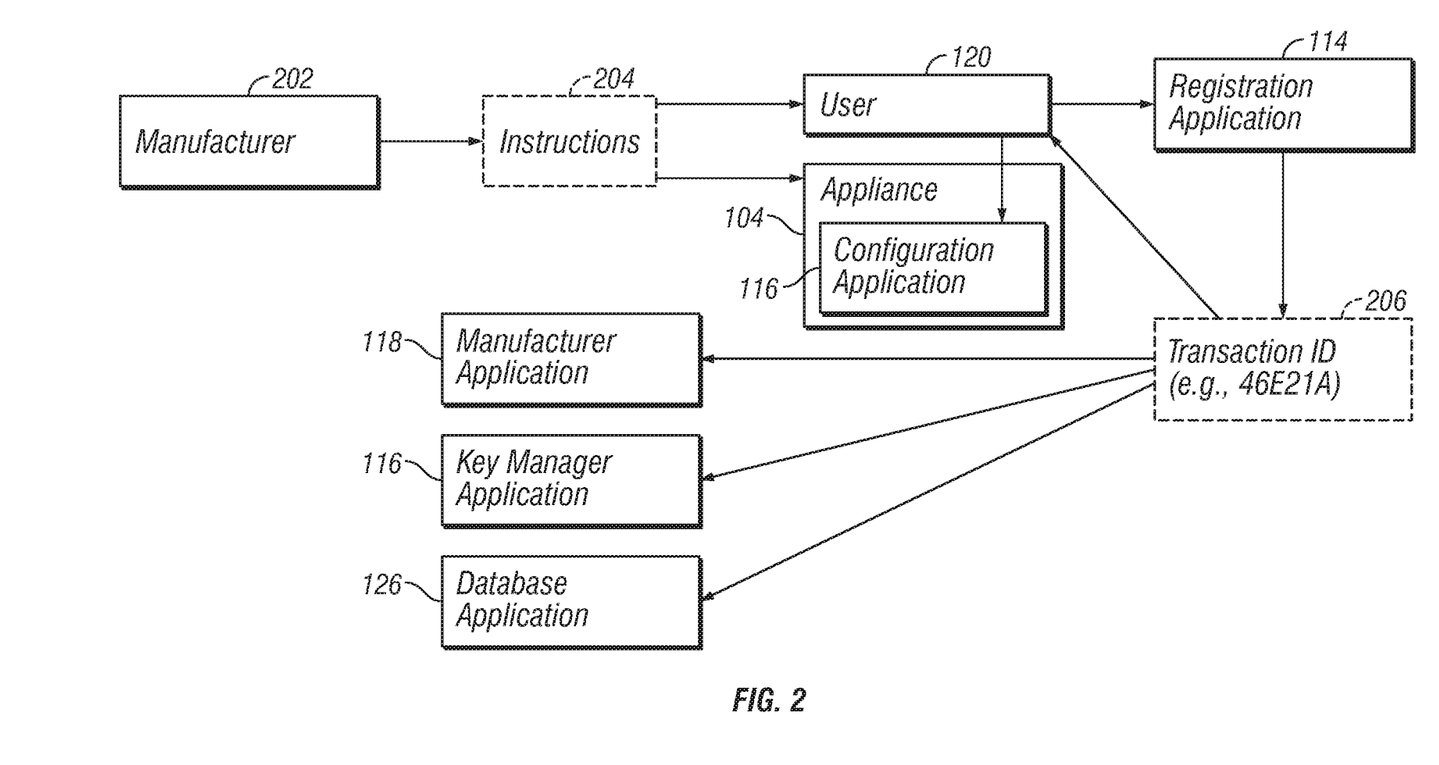
FIG. 2 is an illustration of example operation of a system to begin registration of an appliance to perform anonymous logging, in accordance with embodiments of the present disclosure.

FIG. 2 is an illustration of example operation of system 100 to begin registration of an appliance to perform anonymous logging, in accordance with embodiments of the present disclosure.

Instructions 204 for registering appliance 104 may be provided by an entity such as a manufacturer 202. Instructions 204 may be provided directly to user 120 or through appliance 104 itself. User 120, separately or with appliance 104, may access registration application 114. Registration application 114 may be running on, for example, a website, on the manufacturer's system, or within appliance 104 itself. Registration application 114 may cause, by itself or in conjunction with suitable elements, generation of a nonce or transaction identifier 206. The nonce 206 may be randomized. For illustrative purposes, this may be determined to be the string "46E21A". The nonce 206 may be provided to any suitable recipient, such as user 120, registration application 114 in appliance 104, manufacturer application 132, key manager application 130, or database application 126. In one embodiment, registration application 114 in appliance 104 may direct the next steps. If necessary, user 120 may enter the nonce value 206 into appliance 104.

Figure 3:
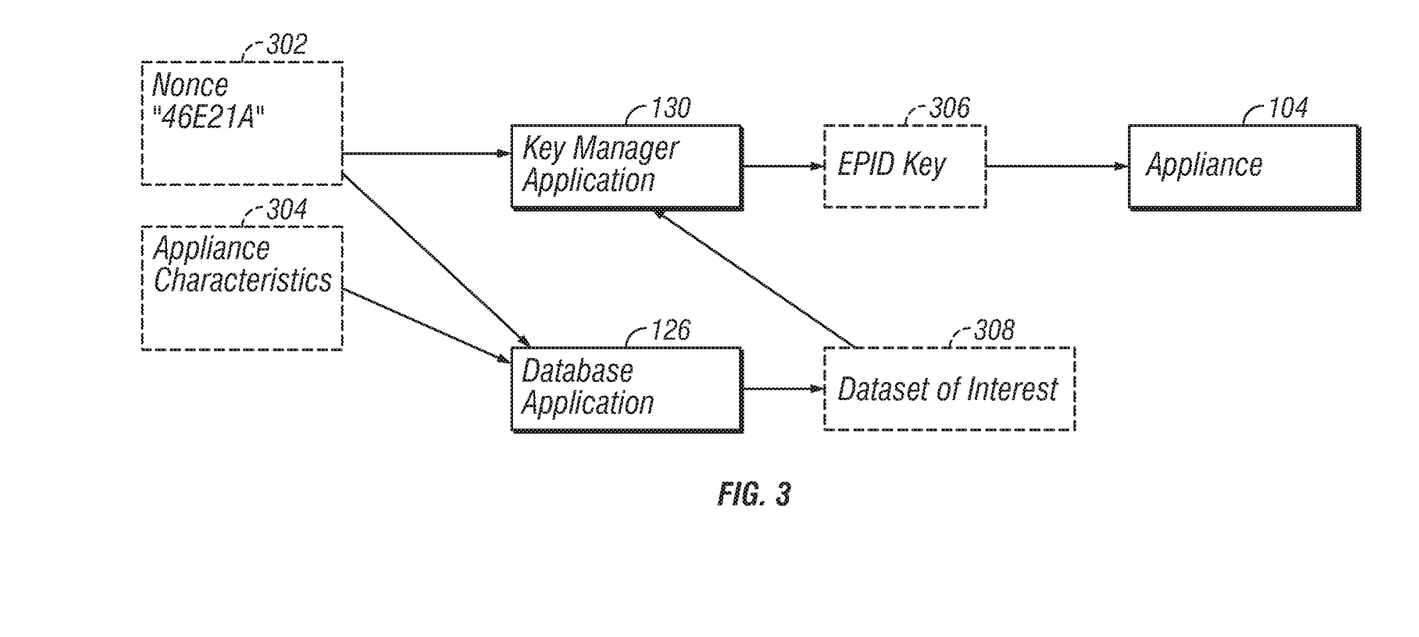
FIG. 3 is an illustration of further operation of the system to generate an EPID key for an appliance, in accordance with embodiments of the present disclosure.

FIG. 3 is an illustration of further operation of the system 100 to generate an EPID key for appliance 104, in accordance with embodiments of the present disclosure. The operations of FIG. 3 may be performed, for example, by appliance 104, registration application 114, or manufacturer application 118.

Nonce value 302 (received as nonce value 206) may be passed to database application 126, along with a description 304 of the characteristics or demographics of appliance 104, such as its model, make, type, location, etc. These may be used to uniquely identify a type of dataset to be stored in database 128 for the anonymous data that will be generated. This type of dataset may be designated as the digital object identifier (DOI) 308. The DOI 308 may be associated with references from standards organizations or architectures defining objects. The DOI 308 may correspond to other DOIs to be generated by different instances of the same or equivalent appliance.

The nonce value 302 and the DOI 308 may be passed to key manager application 130. Based upon the DOI 308, key manager application 130 may be configured to determine to which EPID group that appliance 104 will belong. The nonce value 302 may be used to register that this particular appliance 104 will be making data contributions to the DOI 308, along with similarly situated appliances. According to the EPID group that is determined, an appropriate EPID key 306 may be returned. EPID key 306, configured for appliance 104 to encrypt or sign data, may be passed to appliance 104. Key manager application 130 may store the DOI 308 with EPID key 306 so that appliance 104 has the DOI 308 readily available, rather than needing to obtain it again.

Data generated and signed by EPID key 306 may be unlocked using a public pair counterpart to EPID key 306. By successfully unlocking the data, a consumer of the unlocked data may determine that the data belongs to the DOI 308 used to create EPID key 306, but it might not be able to tell which member of the set of appliances associated with DOI 308 generated the data.

Figure 4:
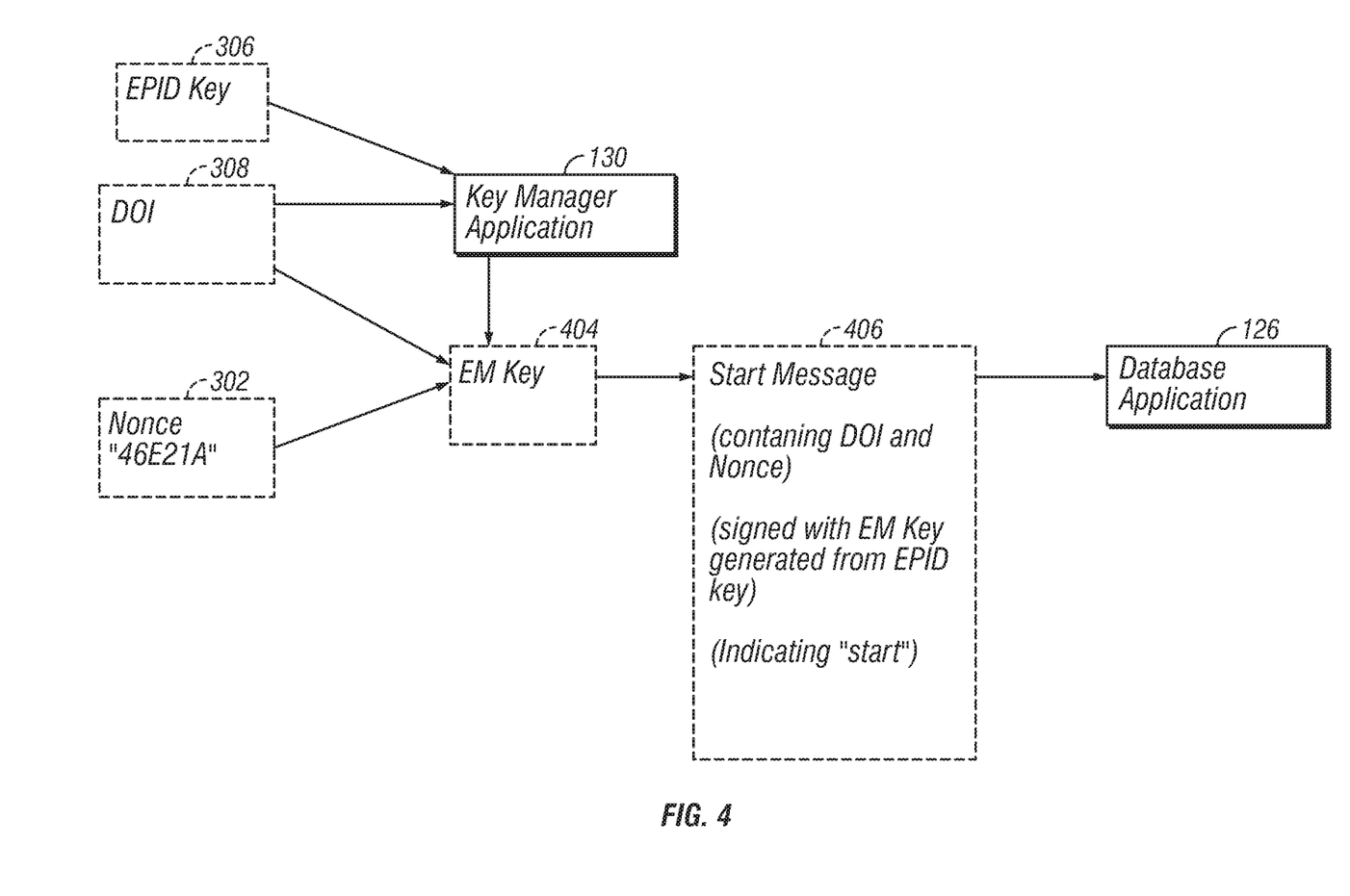
FIG. 4 is an illustration of yet further operation of a system to establish logging capabilities of an appliance, in accordance with embodiments of the present disclosure.

FIG. 4 is an illustration of yet further operation of system 100 to establish logging capabilities of appliance 104, in accordance with embodiments of the present disclosure. The operations of FIG. 4 may be performed, for example, by appliance 104.

Appliance 104 may be configured to use EPID key 306 and DOI 308 to create a new message. For example, appliance 104 may use a JOIN protocol to use EPID key 306 and DOI 308 to create an EPID member key (EM) 404. Appliance 104 may utilize key manager application 130 to perform this creation of the EM 404. EM key 404 may encrypt information that may be unlocked with a key associated with the DOI 308. Thus, EM key 404 may be private, but the keys to unlock it may be public. Accordingly, information purporting to be logged information associated with DOI 308 may be verified by successfully unlocking message 406 using the public key pair of EM key 404. Furthermore, the data that was generated might not include information identifying the particular instance of appliance 104.

Furthermore, appliance 104 may be configured to create message 406 to indicate that it will begin providing anonymous data to database 128. For example, appliance 104 may create a start message 406 that includes nonce 302 and DOI 308. Appliance 104 may sign this start message with EM 404. Start message 406 may be passed to database application 126. Start message 406 may indicate that appliance 104 will be providing anonymous data to database 128. Start message 406 may be created and sent once, periodically, or may be cancelled by a remove operation.

Database application 126 may store start message 406 in database 128 in a location wherein the manufacturer (or similar entity) will know to look for the start message.

Start message 406, as well as subsequent messages created by appliance 104, may include any suitable number and kind of fields for specifying parameters of the operation of system 100. For example, start message 406 may include a field stating "START", wherein start message 406 may indicate to the manufacturer that data will begin to be logged anonymously. In another example, a subsequent message may include a field stating "END", wherein the message may indicate to the manufacturer that data will no longer be logged. In yet another example, a subsequent message may include a field stating "CONTINUE", wherein the message may indicate to the manufacturer that data is continuing to be logged.

Figure 5:
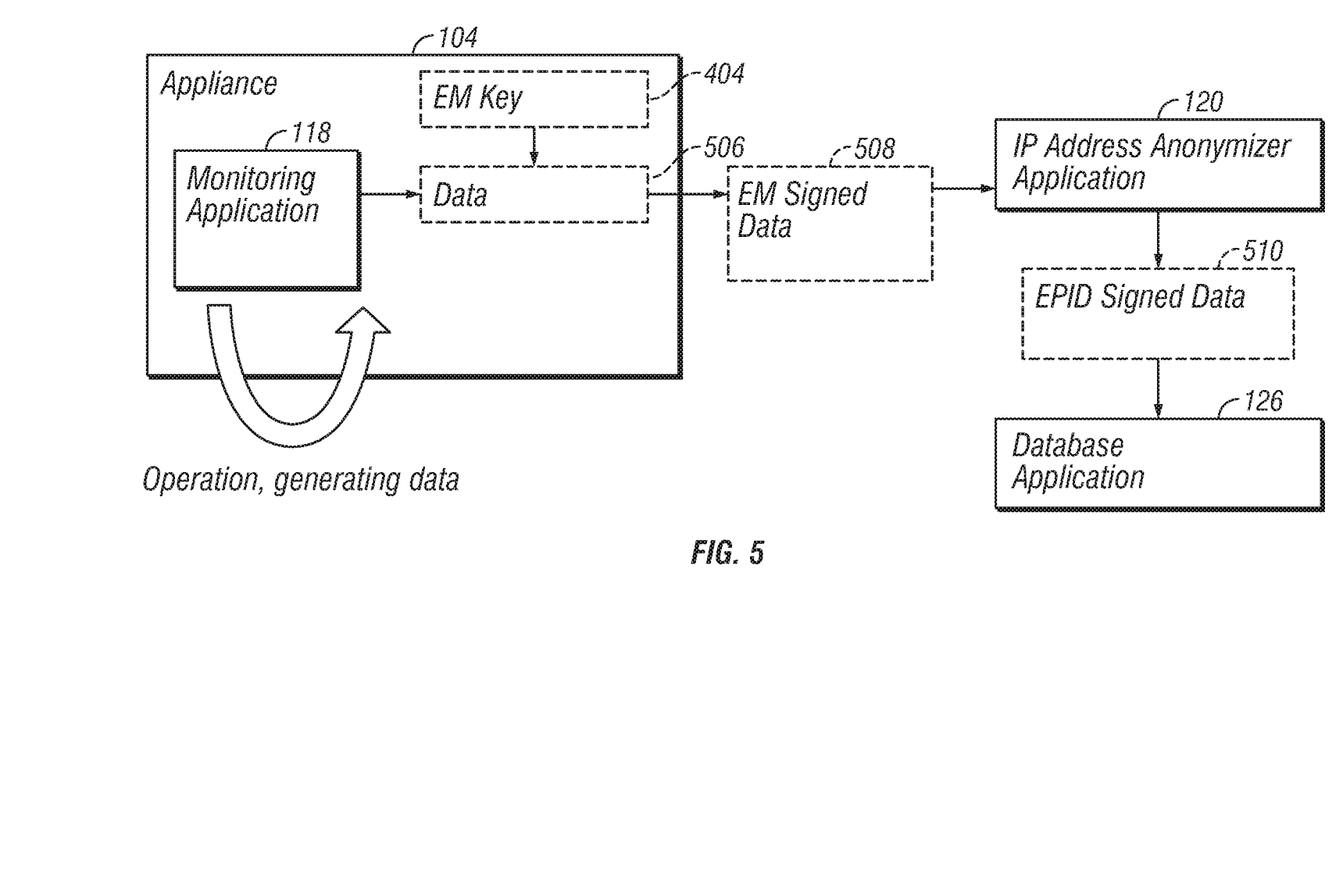
FIG. 5 is an illustration of yet further operation of a system to perform anonymous logging, in accordance with embodiments of the present disclosure.

FIG. 5 is an illustration of yet further operation of system 100 to perform anonymous logging, in accordance with embodiments of the present disclosure. Appliance 104 may be configured to perform operations which may generate data 506. Data 506 may be reported at designated or periodic times as-is appropriate for the nature of data 506. Data 506 may be generated by the monitoring application of appliance 104.

Data 506 may be signed with EM key 404 by appliance 104, yielding EM-signed data 508. Appliance 104 may send EM-signed data 508 to IP address anonymizer application 120. Data such as the IP address of appliance 104 or other traceable information of envelope data may be removed. In one embodiment, only envelope data, such as the IP address in address fields, might be removed, while the original data generated by appliance 104 may be kept the same. Data 510 may then be sent to database application 126.

Database application 126 may be configured to decrypt data 510 using the EPID key and noting to what dataset data 510 will be added. Data 510 may be added to the dataset of interest denoted by the message. However, the source of data 510—appliance 104—may be anonymous, as the transaction ID or nonce and any other data that identifies the particular source of data 510 was not included.

Figure 6:
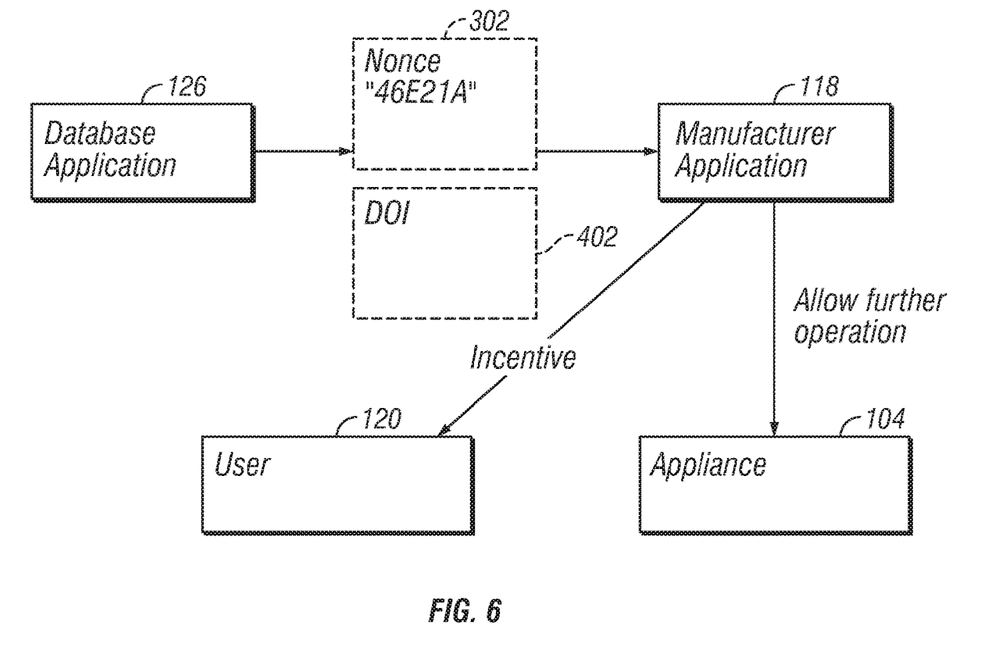
FIG. 6 is an illustration of yet further operation of a system to verify that anonymous logging has been performed by an appliance, in accordance with embodiments of the present disclosure.

FIG. 6 is an illustration of yet further operation of system 100 to verify that anonymous logging has been performed by appliance 104, in accordance with embodiments of the present disclosure. In FIG. 6, the manufacturer (or similar entry) may validate that appliance has registered to send data anonymously, or started to send in data anonymously. In one embodiment, manufacturing application may poll database 128 through database application 126 to see if appliance 104 has started to send in data anonymously. Such verification may be made by checking to see if the transaction ID or nonce 302 has been registered with the appropriate dataset 402. The verification may be made, for example, upon a request from the manufacturer or another entity that needs to verify that data has been logged. Verification may include that the transaction ID or nonce 302 has been registered and that the DOI 402 has at least some information from logging activities. Verification may also include that at least one final or terminate message was received associated with nonce 302.

Based upon a receipt of an acknowledgement from database application 126 that nonce 302 and appropriate DOI 402 were recorded by a previous message from appliance 104, the manufacturer may take appropriate action. For example, manufacturer application 132 may issue an incentive to user 120 such as, for example, a rebate. In another example, manufacturer application 132 may allow appliance 104 to continue operating.

Figure 7:
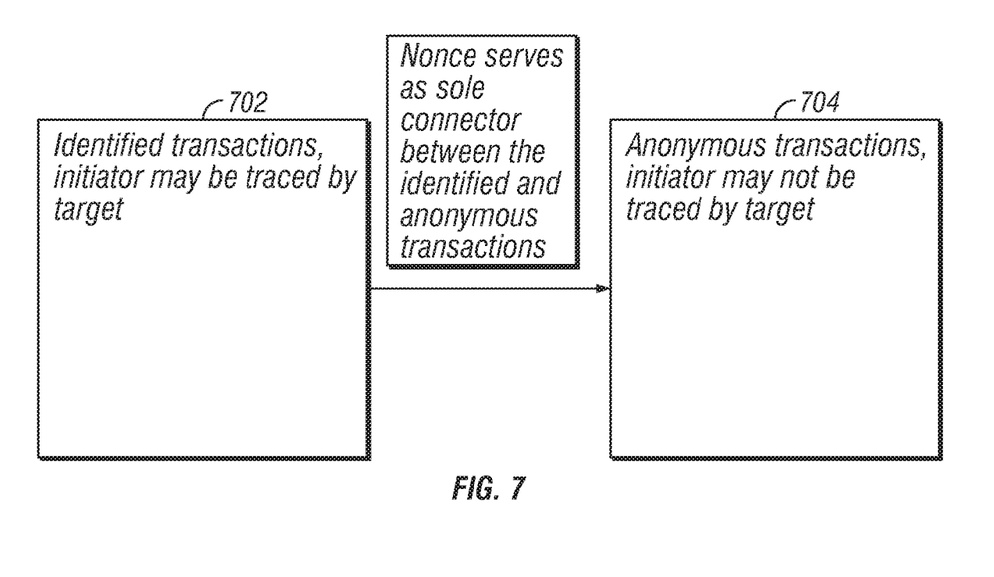
FIG. 7 illustrates operation with respect to anonymous and non-anonymous transactions and operations, in accordance with embodiments of the present disclosure.

FIG. 7 illustrates operation with respect to anonymous 704 and non-anonymous 702 transactions and operations, in accordance with embodiments of the present disclosure.

An identified transaction or operation may be taking place, wherein an initiator of the transaction or operation may be traced by the target. For example, a set of transactions or operations by the initiator on a given day may be correlated with transactions on another given day. Meanwhile, an anonymous transaction or operation might also be taking place, wherein the initiator sends data to the target, but the initiator cannot be traced by the target. For example, the data sent on one day might not be correlated with data sent on another day as being from the same initiator.

Other example applications, in addition to those discussed above, may be implemented by embodiments of the present disclosure. For example, a members-only facility such as a health club may wish to restrict physical access to only its members. This might require that access to the facility be restricted through checking to see if people seeking access to the facility are members. This might be performed by checking identification. However, members might wish that their usage of the facility not be specifically tracked, as the information might be misused by facility or offsite personnel. For example, additional identity information might be compromised if a tracking database were hacked, not physically secured, or otherwise leaked. Embodiments of the present disclosure may be used to keep members' personal details secret from the systems or people who are inspecting whether the patrons are club members. Furthermore, embodiments of the present disclosure remove the possibility that people's identities might be exposed if database is stolen or otherwise leaked to the public. Database would only indicate that access was granted to a certain number of patrons, without identifying which such patrons attended. Thus, even if database were made open to the public, the users' privacy would still be maintained.

A member might be identified using, for example, an application on the member's smartphone. The smartphone may contain credentials to login to the club, as an identified transaction. When user enters the club, the smartphone may contact the club using these credentials, and is given a nonce and DOI, and allocated an EPID key. The club computer may verify that the membership is up to date, signs the nonce with its own EPID key in the same EPID group, and insert it into the "current members" database.

The smartphone may sign its copy of the nonce and DOI using the EPID key and sends it to the front desk, using a suitable communications mechanism such as a QR code, NFC or WiFi networking. The front desk computer may verify the EPID signature, and checks to see that the nonce is in database, thus granting access.

This scheme may be optimized for memberships that last a month at a time by having the club send the nonce with an expiration date on a schedule. The user's application might only need only to obtain a nonce once every month. In addition, database 128 might not be required to be private, so the front desk computer may have a local copy of the membership database which is retrieved on a regular basis (e.g., daily) and use it for offline processing of members (e.g., at a race, event, or track meet).

This example may also be used for other kinds of membership, such as sporting events or libraries.

A biometric, such as a picture, may be included in the database (signed with EPID) to allow the front desk personnel to verify that the smartphone is held by the right person.

In some embodiments, the owner of an appliance may wish to anonymize the data from his appliances using software of his own choosing, rather than relying on appliance manufacturer to implement this invention correctly. This is possible when user owns the network that appliance uses to connect to the Internet. User may provision a proxy that receives the nonce from user with the protocol with the trust broker and data object registration server. Then user may put the nonce into appliance. Appliance may have a setting to use the user's proxy directly (explicit proxy) or the user's proxy may masquerade as trust broker and data object registration server, returning the same EPID key material. In either case, the user's proxy may masquerade as the data object registration server to receive data to be logged by appliance. The user's proxy can then sign the data using its own copy of the EPID key. The proxy can also allow the user to inspect the data before it is sent to the database.

Figure 8:
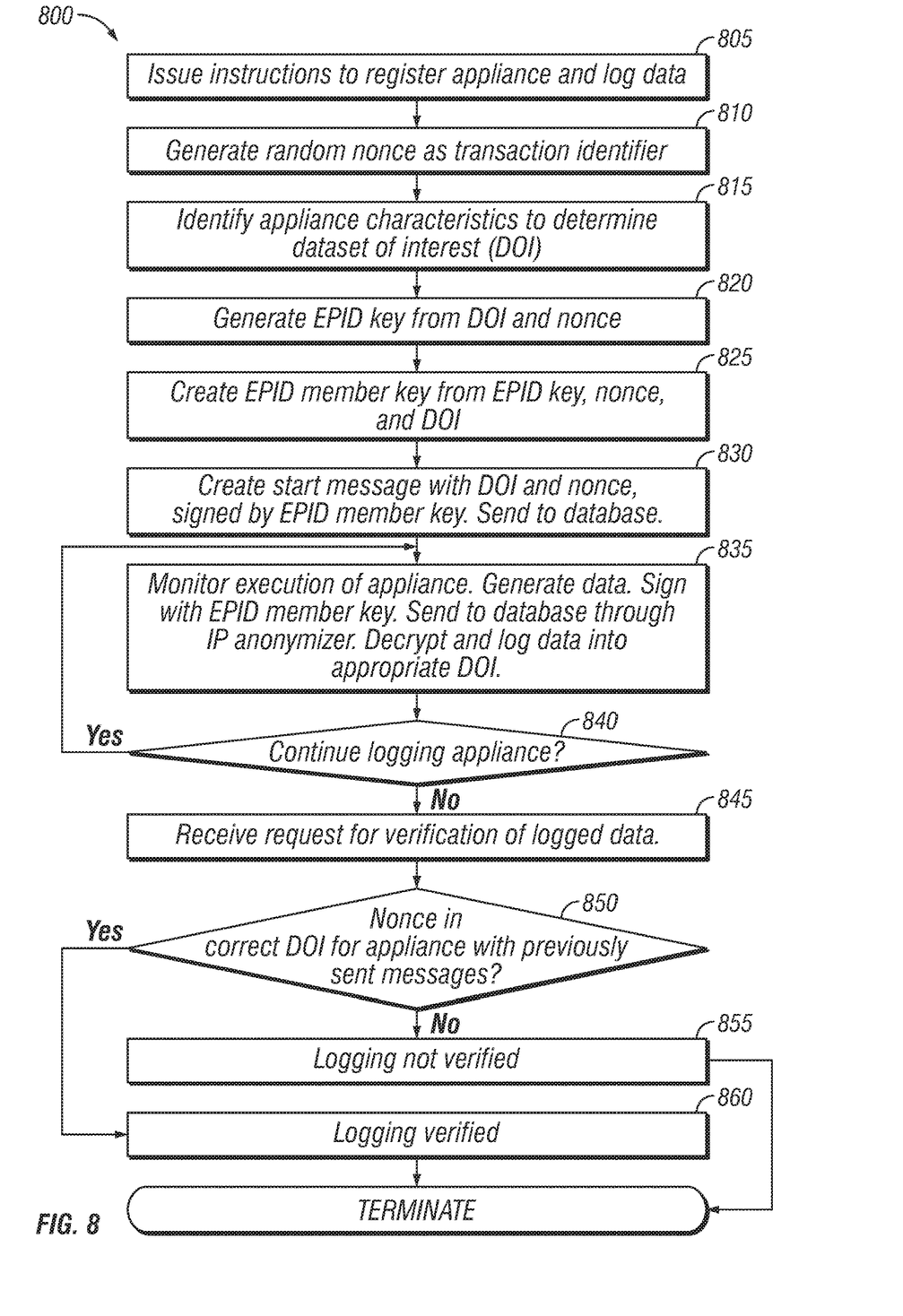
FIG. 8 is a flowchart of an example method for anonymous device operation, in accordance with embodiments of the present disclosure.

FIG. 8 is a flowchart of an example method 800 for anonymous device operation, in accordance with embodiments of the present disclosure. Method 800 may begin at any suitable point and execute in any similar manner. Method 800 may be implemented by the elements shown in FIGS. 1-7. Method 800 may optionally repeat or terminate at suitable points. Multiple instances of method 800, or portions thereof, may operate recursively or in parallel. For example, multiple instances of 805-840 may execute in parallel with 845-860. Method 800 may begin at, for example, 805.

At 805, instructions to register an appliance and log data may be issued. Such instructions may arise, for example, from a manufacturer of the appliance, a service provider to serve the appliance, or an owner or administrator of a network in which the appliance resides. The instructions may be issued electronically.

At 810, a random nonce may be generated as a transaction identifier. The nonce may be generated at the appliance. At 815, characteristics of the appliance, or data that it may generate, may be identified to determine a DOI that will be associated with generated data from the appliance.

At 820, an EPID key may be generated from the DOI and the nonce. The EPID key may allow the appliance to sign data as a member of a group of devices associated with the DOI. However, data signed with the EPID key will not identify which member of the group of devices signed the data when it is decrypted or verified with a public pair key for the EPID key. The EPID key used by the appliance may be unique to the appliance and issued by a key broker. At 825, an EPID member key may be generated from the EPID key, nonce, and DOI.

At 830, a start message may be created to establish the ability to log data anonymously. The start message might not be anonymous, as it may include the nonce which might identify the appliance. The start message may be signed with the EPID member key and sent to a database. The database may verify that the start message was correctly signed by a member of the group with the DOI. Furthermore, the database may verify that the appliance, identified by the nonce, has established the ability to log data to the database.

At 835, execution of the appliance may be monitored. Data may be generated as a result. The data may be signed with the EPID member key and sent to the database. The data may be routed through an IP address anonymizer or proxy to eliminate a source IP address of the data corresponding to the appliance. The data may be decrypted or verified with a public counterpart to the EPID key or EPID member key. The data may be verified as associated with a particular DOI and logged to a corresponding part of the database. The data might be anonymous as to which particular appliance from the group sharing the DOI generated the data.

At 840, it may be determined whether logging for the appliance will continue. If not, an end message may be sent from the appliance to the database. Method 800 may continue at 845 or optionally repeat at, for example, 830 upon a subsequent triggering condition to log data. Otherwise, method 800 may repeat at 835.

At 845, a request may be received for verification of logged data. At 850, the database may be checked to determine whether a nonce corresponding to the appliance has been registered with the database. The appliance may be generated a start message to initiate logging. However, actual logged data might not be verified as produced by the specific appliance. If the nonce has been registered, at 855 it may be determined that logging is not verified. If the nonce has not been registered, at 860 it may be determined that logging is verified. Method 800 may optionally repeat at 845 or terminate.

The execution of the system may be implemented in any suitable number and kind of methods. The methods may begin at any suitable point, may repeat, and may reference each other. The methods may be implemented fully or in parts by instructions on computer-readable media for execution by a processor. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

The following examples pertain to further embodiments. Specifics in the examples may be used anywhere in one or more embodiments described above or herein.

Embodiments of the present disclosure include an appliance. The appliance may include a processor, a non-transitory computer-readable medium communicatively coupled to the processor, and a registration application comprising instructions in the medium that. In combination with any of the above embodiments, the instructions, when read and executed by the processor, configure the registration application to write a transaction identifier to a start message, the transaction identifier identifying the appliance. In combination with any of the above embodiments, the registration application may be configured to write a dataset of interest identifier to the start message. In combination with any of the above embodiments, the dataset of interest may identify a group of appliances including the appliance. In combination with any of the above embodiments, the registration application may be configured to send the start message to a database. In combination with any of the above embodiments, a monitoring application may include instructions in the medium that, when read and executed by the processor, configure the monitoring application to monitor operations executed on the appliance. In combination with any of the above embodiments, the monitoring application may be configured to write data resulting from the operations to a data message. In combination with any of the above embodiments, the data message may be signed with a member key associated with the group of appliances. In combination with any of the above embodiments, the monitoring application may send the data message anonymously to the database. In combination with any of the above embodiments, the registration application may be further configured to generate the transaction identifier from a random number. In combination with any of the above embodiments, the registration application may be further configured to receive a command to provide verification of logging data to the database, and, based upon the command, create the start message and send the start message to the database. In combination with any of the above embodiments, the registration application may be further configured to receive a command to provide verification of logging data to the database and the monitoring application may be further configured to, based upon the command, create the data message and send the data message to the database. In combination with any of the above embodiments, the registration application may be further configured to cause generation of the member key based upon the transaction identifier and the dataset of interest. In combination with any of the above embodiments, the registration application may be further configured to cause generation of the member key based upon the transaction identifier and the dataset of interest. In combination with any of the above embodiments, the member key may be configured to be unique to the appliance. In combination with any of the above embodiments, the signed data message might not identify the appliance. In combination with any of the above embodiments, the registration application may be further configured to cause generation of an EPID key based upon the transaction identifier and the dataset of interest, and cause generation of the member key with a join operation including the EPID key and the dataset of interest identifier. In combination with any of the above embodiments, the registration application may be configured to verify compliance with a logging requirement to a service provider.

Embodiments of the present disclosure include at least one non-transitory computer-readable medium including instructions. The instructions, when read and executed by a processor, cause the processor to write a transaction identifier to a start message, the transaction identifier identifying the appliance. In combination with any of the above embodiments, the medium may include instructions to further cause the processor to write a dataset of interest identifier to the start message. In combination with any of the above embodiments, the dataset of interest may identify a group of appliances including the appliance. In combination with any of the above embodiments, the medium may include instructions to further cause the processor to send the start message to a database. In combination with any of the above embodiments, the medium may include instructions to further cause the processor to monitor operations executed on the appliance. In combination with any of the above embodiments, the medium may include instructions to further cause the processor to write data resulting from the operations to a data message. In combination with any of the above embodiments, the data message may be signed with a member key associated with the group of appliances. In combination with any of the above embodiments, the medium may include instructions to further cause the processor to send the data message anonymously to the database. In combination with any of the above embodiments, the medium may include instructions to further cause the processor to generate the transaction identifier from a random number. In combination with any of the above embodiments, the medium may include instructions to further cause the processor to receive a command to provide verification of logging data to the database, and, based upon the command, create the start message and send the start message to the database. In combination with any of the above embodiments, the medium may include instructions to further cause the processor to receive a command to provide verification of logging data to the database and, based upon the command, create the data message and send the data message to the database. In combination with any of the above embodiments, the medium may include instructions to further cause the processor to cause generation of the member key based upon the transaction identifier and the dataset of interest. In combination with any of the above embodiments, the medium may include instructions to further cause the processor to cause generation of the member key based upon the transaction identifier and the dataset of interest. In combination with any of the above embodiments, the member key may be configured to be unique to the appliance. In combination with any of the above embodiments, the signed data message might not identify the appliance. In combination with any of the above embodiments, the medium may include instructions to further cause the processor to cause generation of an EPID key based upon the transaction identifier and the dataset of interest, and cause generation of the member key with a join operation including the EPID key and the dataset of interest identifier. In combination with any of the above embodiments, the medium may include instructions to further cause the processor to verify compliance with a logging requirement to a service provider.

Embodiments of the present disclosure may include a method of logging data of an appliance. The method may include writing a transaction identifier to a start message, the transaction identifier identifying the appliance. In conjunction with any of the above embodiments, the method may include writing a dataset of interest identifier to the start message, the dataset of interest identifying a group of appliances including the appliance. In conjunction with any of the above embodiments, the method may include sending the start message to a database. In conjunction with any of the above embodiments, the method may include monitoring operations executed on the appliance. In conjunction with any of the above embodiments, the method may include writing data resulting from the operations to a data message, the data message signed with a member key associated with the group of appliances. In conjunction with any of the above embodiments, the method may include sending the data message anonymously to the database. In conjunction with any of the above embodiments, the method may include generating the transaction identifier from a random number. In conjunction with any of the above embodiments, the method may include receiving a command to provide verification of logging data to the database. In conjunction with any of the above embodiments, the method may include, based upon the command, creating the start message and send the start message to the database. In conjunction with any of the above embodiments, the method may include receiving a command to provide verification of logging data to the database and, based upon the command, creating the data message and send the data message to the database. In conjunction with any of the above embodiments, the method may include causing generation of the member key based upon the transaction identifier and the dataset of interest. In conjunction with any of the above embodiments, the method may include causing generation of the member key based upon the transaction identifier and the dataset of interest. In conjunction with any of the above embodiments, the member key may be configured to be unique to the appliance. In conjunction with any of the above embodiments, the signed data message might not identify the appliance. In conjunction with any of the above embodiments, the method may include causing generation of an EPID key based upon the transaction identifier and the dataset of interest. In conjunction with any of the above embodiments, the method may include causing generation of the member key with a join operation including the EPID key and the dataset of interest identifier. In conjunction with any of the above embodiments, the method may further include verifying compliance with a logging requirement to a service provider.

Embodiments of the present disclosure may include an apparatus. The apparatus may include means for writing a transaction identifier to a start message, the transaction identifier identifying the appliance. In conjunction with any of the above embodiments, the apparatus may include means for writing a dataset of interest identifier to the start message, the dataset of interest identifying a group of appliances including the appliance. In conjunction with any of the above embodiments, the apparatus may include means for sending the start message to a database. In conjunction with any of the above embodiments, the apparatus may include means for monitoring operations executed on the appliance. In conjunction with any of the above embodiments, the apparatus may include means for writing data resulting from the operations to a data message, the data message signed with a member key associated with the group of appliances. In conjunction with any of the above embodiments, the apparatus may include means for sending the data message anonymously to the database. In conjunction with any of the above embodiments, the apparatus may include means for generating the transaction identifier from a random number. In conjunction with any of the above embodiments, the apparatus may include means for receiving a command to provide verification of logging data to the database. In conjunction with any of the above embodiments, the apparatus may include means for, based upon the command, creating the start message and send the start message to the database. In conjunction with any of the above embodiments, the apparatus may include means for receiving a command to provide verification of logging data to the database and, based upon the command, creating the data message and send the data message to the database. In conjunction with any of the above embodiments, the apparatus may include means for causing generation of the member key based upon the transaction identifier and the dataset of interest. In conjunction with any of the above embodiments, the apparatus may include means for causing generation of the member key based upon the transaction identifier and the dataset of interest. In conjunction with any of the above embodiments, the member key may be configured to be unique to the appliance. In conjunction with any of the above embodiments, the signed data message might not identify the appliance. In conjunction with any of the above embodiments, the apparatus may include means for causing generation of an EPID key based upon the transaction identifier and the dataset of interest. In conjunction with any of the above embodiments, the apparatus may include means for causing generation of the member key with a join operation including the EPID key and the dataset of interest identifier. In combination with any of the above embodiments, the apparatus may include means for verifying compliance with a logging requirement to a service provider.

Although the present disclosure has been described in detail, it should be understood that various changes, substitutions, and alterations can be made hereto without departing from the spirit and the scope of the disclosure as defined by the appended claims.

What is claimed is:

1. A system, comprising:
   a memory; and
   a hardware processor coupled to the memory and configured to:
   generate a transaction identifier from a nonce;
   form a start message including: the nonce; and a dataset of interest identifier identifying a group of appliances including the appliance;
   generate a private Enhanced Privacy Identification (EPID) key from the dataset of interest identifier and the nonce;
   generate a private EPID member key from the private EPID key, the nonce, and the dataset of interest identifier;
   sign the start message using the private EPID member key to form a signed start message; and
   send the signed start message to a database.

2. The system of claim 1, wherein the nonce is a random number.

3. The system of claim 1, wherein the hardware processor is also configured to receive a command to provide logging data to the database, wherein the forming the start message, the signing the start message, and the sending the start message to the database are based on the command.

4. The system of claim 1, wherein the hardware processor is also configured to, subsequent to sending the start message to the database:
   monitor operations executed on the appliance;
   write data resulting from the operations to a data message;
   sign the data message using the private EPID member key to form a signed data message; and
   send the signed data message anonymously to the database.

5. The system of claim 4, wherein the hardware processor is also configured to receive a command to provide logging data to the database, wherein the creating the signed data message and the sending the signed data message to the database are based on the command.

6. The system of claim 4, wherein the private EPID member key is configured to be unique to the appliance, and wherein the signed data message does not identify the appliance.

7. A method, comprising:
   generating a transaction identifier from a nonce;
   forming, using a hardware processor, a start message including: the nonce; and a dataset of interest identifier identifying a group of appliances including the appliance;
   generating a private Enhanced Privacy Identification (EPID) key from the dataset of interest identifier and the nonce;
   generating a private EPID member key based upon the transaction identifier from the private EPID key, the nonce, and the dataset of interest identifier;
   signing, using the hardware processor, the start message using the private EPID member key to form a signed start message; and
   sending the signed start message to a database.

8. The method of claim 7, the nonce is a random number.

9. The method of claim 7, further comprising: receiving a command to provide logging data to the database, wherein the forming the start message, the signing the start message, and the send the start message to the database are based on the command.

10. The method of claim 7, further comprising, subsequent to sending the start message to the database:

monitoring operations executed on the appliance;

writing data resulting from the operations to a data message;

signing the data message using the private EPID member key to form a signed data message; and sending the signed data message anonymously to the database.

11. The method of claim 10, further comprising receiving a command to provide logging data to the database, and wherein the creating the signed data message and the sending the signed data message to the database are based on the command.

12. The method of claim 10, wherein the private EPID member key is configured to be unique to the appliance, and wherein the signed data message does not identify the appliance.

13. A non-transitory computer-readable medium containing computer-executable instructions that, when executed by a processor, cause the processor to perform a method, the method comprising:

generating a transaction identifier from a nonce;

forming a start message including: the nonce; and a dataset of interest identifier identifying a group of appliances including the appliance;

generating a private Enhanced Privacy Identification (EPID) key from the dataset of interest identifier and the nonce;

generating a private EPID member key from the private EPID key, the nonce, and the dataset of interest identifier;

signing the start message using the private EPID member key to form a signed start message; and sending the signed start message to a database.

14. The non-transitory computer-readable medium of claim 13, wherein the nonce is a random number.

15. The non-transitory computer-readable medium of claim 13, wherein the method further comprises: receiving a command to provide logging data to the database, wherein the forming the start message, the signing the start message, and the send the start message to the database are based on the command.

16. The non-transitory computer-readable medium of claim 13, wherein the method further comprises, subsequent to sending the start message to the database:

monitoring operations executed on the appliance;

writing data resulting from the operations to a data message;

signing the data message using the private EPID member key to form a signed data message; and sending the signed data message anonymously to the database.

17. The non-transitory computer-readable medium of claim 16, wherein the method further comprises receiving a command to provide logging data to the database, and wherein the creating the signed data message and the sending the signed data message to the database are based on the command.

18. The non-transitory computer-readable medium of claim 16, wherein the private EPID member key is configured to be unique to the appliance, and wherein the signed data message does not identify the appliance.

* * * * *

UNITED STATES PATENT AND TRADEMARK OFFICE
CERTIFICATE OF CORRECTION

PATENT NO. : 10,997,141 B2
APPLICATION NO. : 16/370507
DATED : May 4, 2021
INVENTOR(S) : Geoffrey H. Cooper et al.

It is certified that error appears in the above-identified patent and that said Letters Patent is hereby corrected as shown below:

In the Claims

Column 16, Claim 7, Lines 53-54:
"member key based upon the transaction identifier from the private" should be:
--member key from the private--

Column 16, Claim 8, Line 60:
"The method of claim 7, the nonce is a random number." should be:
--The method of claim 7, wherein the nonce is a random number.--

Signed and Sealed this
Twelfth Day of March, 2024

Katherine Kelly Vidal
*Director of the United States Patent and Trademark Office*